Figure 1:
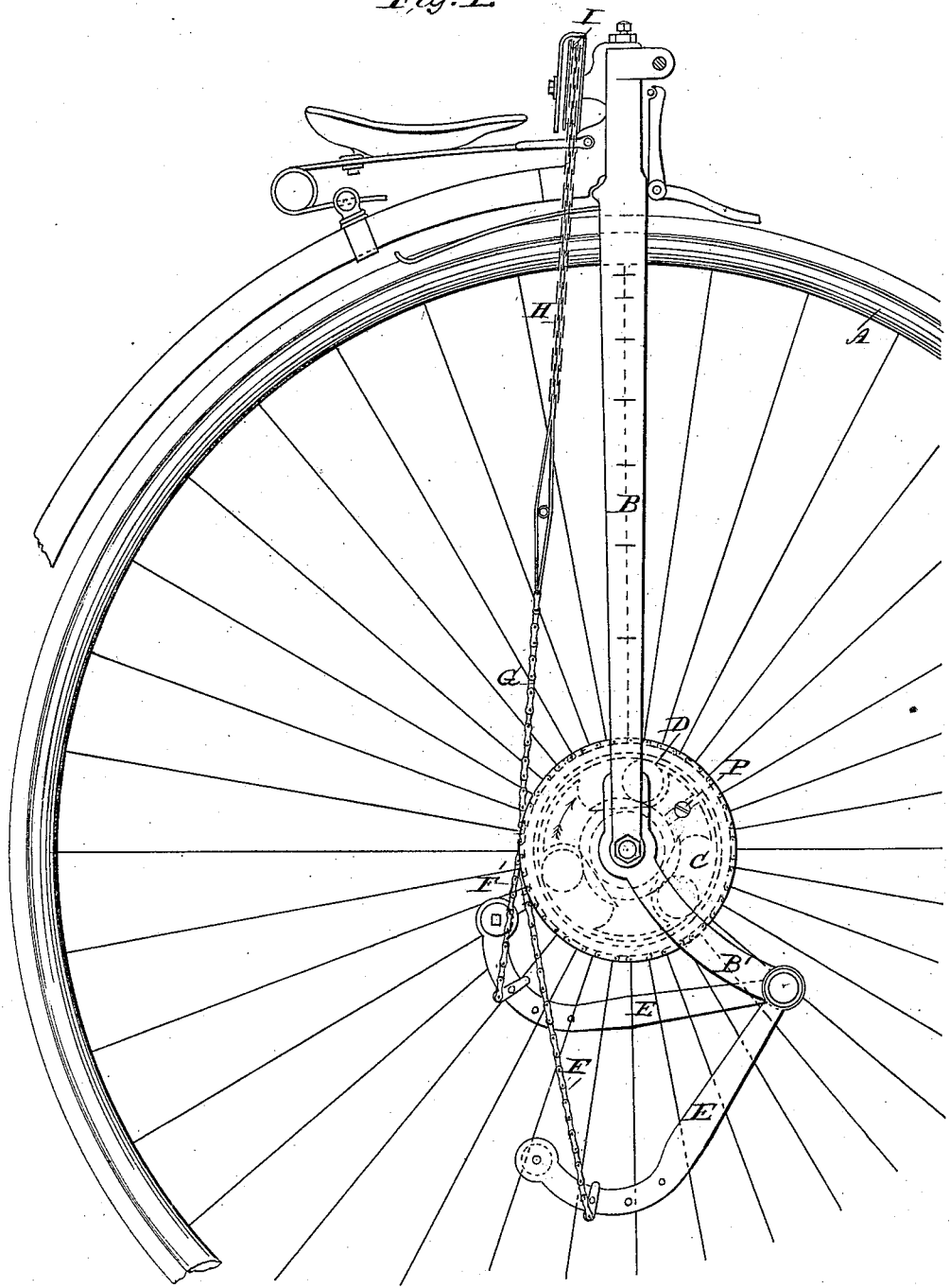

(No Model.) 3 Sheets—Sheet 1.

R. P. SCOTT.
VELOCIPEDE.

No. 340,254. Patented Apr. 20, 1886.

Witnesses:

Inventor:

(No Model.) 3 Sheets—Sheet 2.
R. P. SCOTT.
VELOCIPEDE.
No. 340,254. Patented Apr. 20, 1886.
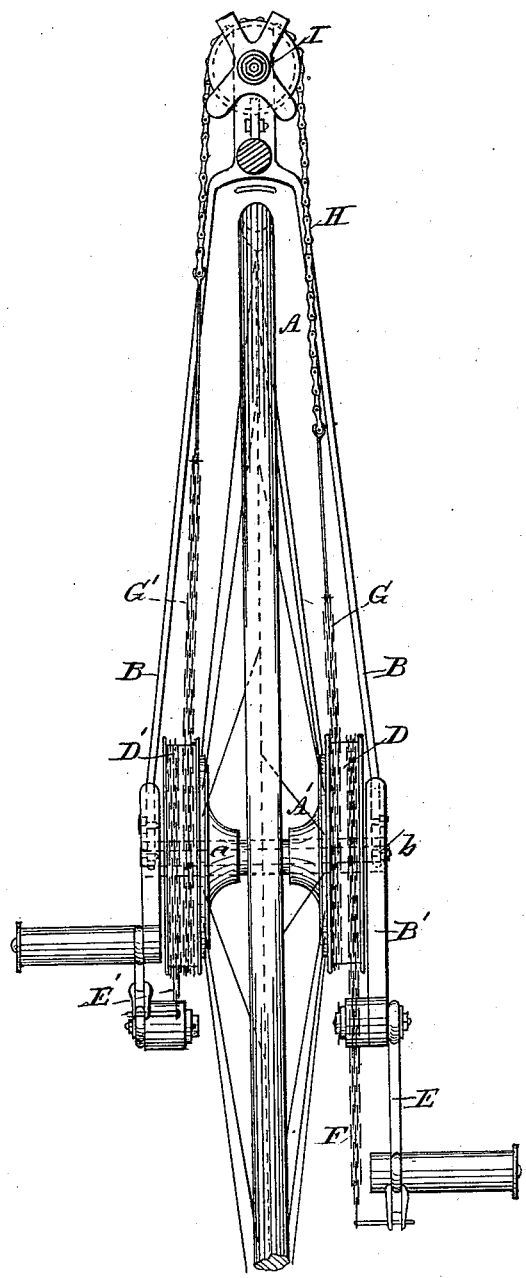
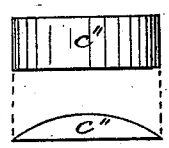
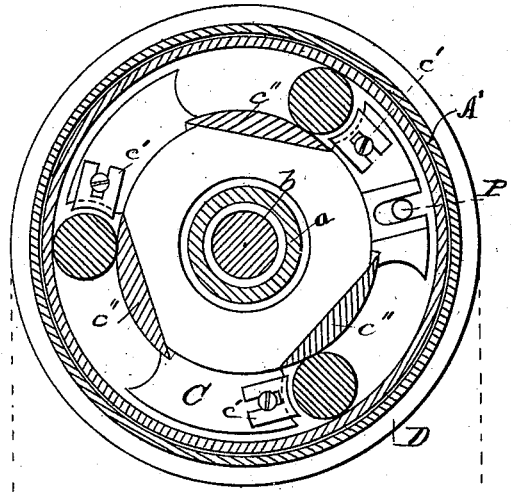
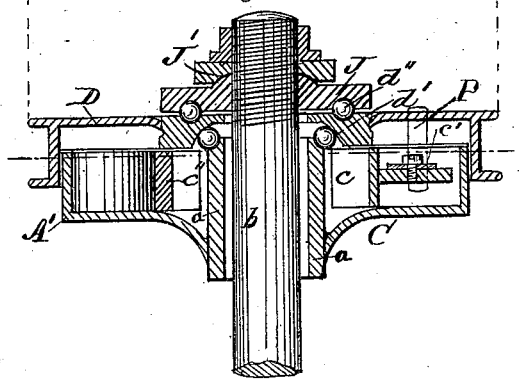
Witnesses:
Inventor, (No Model.) 3 Sheets—Sheet 3.
R. P. SCOTT.
VELOCIPEDE.
No. 340,254. Patented Apr. 20, 1886.
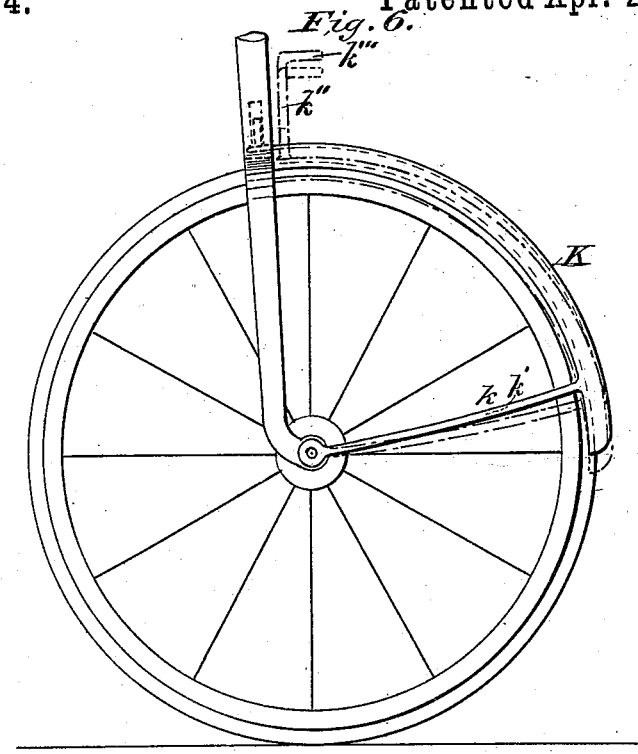
Fig. 6.
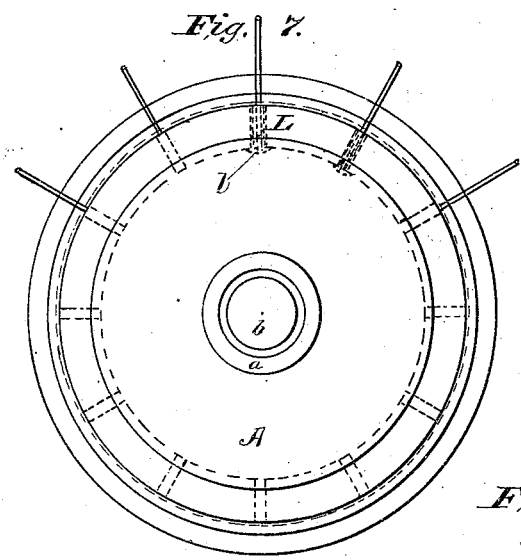
Fig. 7.
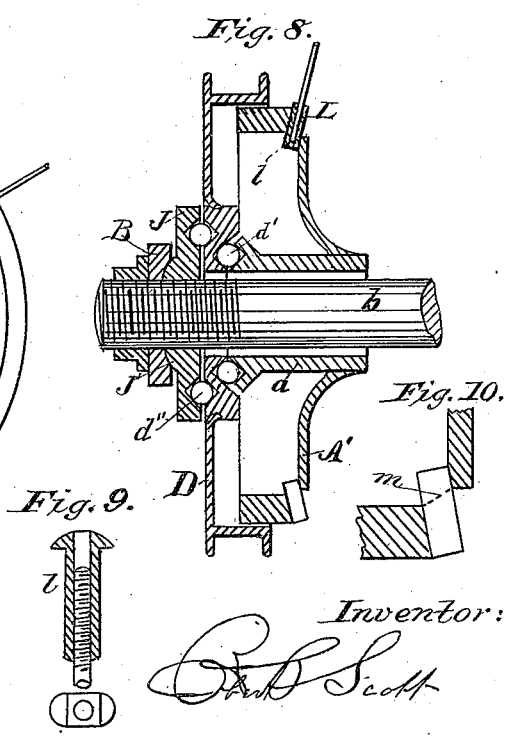
Fig. 8.
Fig. 9.
Fig. 10.
Witnesses:
Inventor:

UNITED STATES PATENT OFFICE.

ROBERT P. SCOTT, OF BALTIMORE, MARYLAND.

VELOCIPEDE.

SPECIFICATION forming part of Letters Patent No. 340,254, dated April 20, 1886.

Application filed December 21, 1885. Serial No. 186,347. (No model.)

*To all whom it may concern:*

Be it known that I, ROBERT P. SCOTT, a citizen of the United States, residing at Baltimore, in the State of Maryland, have invented new and useful Improvements in Bicycles; and I do hereby declare the following to be a full, clear, and exact description of the invention, such as will enable others skilled in the art to which it appertains to make and use the same.

My invention relates to improvements in bicycles, to some extent to velocipedes in general, and especially to small bicycles or safety-machines—that is to say, those in which gearing up or speeding is a feature.

The object of my invention is to produce a machine that can be run with less fatigue, less danger, and greater comfort, economizing power, reducing cost in some respects, and otherwise improving the construction, appearance, and general utility of such a machine as that to which my invention relates.

My invention consists, generally, in the use and adaptation of the principle shown in a former application of mine, filed August 2, 1884, and patented to Starr, October 13, 1885, in which the power is transmitted from one side of the drive-wheel to the other, over the periphery thereof, which principle I now apply to a small bicycle, preferably of the common type, having the larger wheel forward and a smaller following.

Specifically, my invention consists in the drums, chains, treadles, drum-bearings, clutch, brake to hind wheel, construction of wheel-hub, and concomitant parts appertaining to those named, together with such general and particular construction, as shown, which would be with difficulty enumerated where, as in this application, the scope of the invention embraces more or less the entire machine.

In the drawings, Figure 1 is a side elevation of front drive-wheel and parts appertaining thereto. Fig. 2 is a rear elevation of Fig. 1. Fig. 3 is a detailed view of roller bed-plate. Fig. 4 is a detailed view of clutch. Fig. 5 is a section of clutch, drums, and drum-bearings, together with bearing for end of drive-wheel axle and shaft. Fig. 6 is a side elevation of back wheel, showing mud-guard brake attached. Fig. 7 is a side view of hub with separable blocks and open slots. Fig. 8 is a section of that part of hub through which blocks pass, together with drum and bearings. Figs. 9 and 10 are detailed views of block with spoke screwed therein and enlarged view of slot, showing parting *m* of sand in casting.

Referring to the drawings, we have a drive-wheel, A, swung upon a hollow axle, *a*, Fig. 2, a front fork, B, supporting a shaft, *b*, said shaft passing through the axle *a* and made fast to fork B by a nut at each end. The drive-wheel hub A' has its face recessed to receive a clutch, C, Fig. 5. A drum, D, intervenes concentrically between the hub A' and the fork B, Fig. 2. A pin, P, connects the drum to the clutch. A treadle, E, swings from the end of a fork-extension, B', not concentrically with the axle *a*, Fig. 1. Two chains, F and G, operate the drum D, chain F connecting with the treadle E and chain G to another chain, H, which last passes up over a pulley, I, beyond the periphery of the drive-wheel, thence down to a corresponding drum, D', Fig. 2, on the other side of the drive-wheel. The second drum, D', has its corresponding chains, and the entire mechanism on the two sides are in every way symmetrical. The chains F G F' G' run on and off the drums D and D' from a rear tangent—that is to say, the side nearest under the saddle or rider's perch. (See Fig. 1.)

As the chain F is drawn off the drum D by the treadle E, the chain G winds on; hence the corresponding chain, G', on the second drum, D', is drawn off. (See Fig. 2.)

Now, the peculiarity in this arrangement consists in that the clutch C grips in its forward motion, (indicated by the arrow;) hence it will be seen that while the rider depresses the treadle E on the one, or, say, the right, side the drum D is revolved backward, and the clutch does not grip to the hub of drive-wheel, while the second or left drum, D', does move forward and its clutch grips, thus giving momentum to the drive-wheel in a forward direction. The advantages of this movement are manifold, but only manifest in full force to one well acquainted with bicycles in their general use and manufacture. However, the compactness, shortness of levers and fork-extensions, in placing the work directly under the rider, together with the absence of springs to lift the treadle, are perhaps the most conspicuous features.

The treadles E E' are raised or lowered, to suit different lengths of leg, by altering the chains on the drums to different points of connection, or by lengthening chain H.

Adjustment for increased speed or power is had by moving the chains along the treadles—that is, nearer to or farther from the fulcrum from which the treadle swings.

Guards are placed over the chains, if desired, to protect the clothing.

The backbone, saddle, handle-bars, front wheel, brake, foot-pedals, and some other parts not directly concerned in this application are not described, but are taken for granted.

The back wheel and its brake are shown separately, as they are features in themselves of this invention. (See Fig. 6.)

The drums D and D' are hung as follows, referring to Fig. 5: A row of balls, $d'$, is placed within, and a row, $d''$, without, the drum D, rolling in suitable recesses. The inner row, $d'$, also affords a bearing for the end of the axle $a$, the ends of which latter are suitably turned to run on balls. The outer row of balls, $d''$, runs in the groove of a bearing-plate, J, which works upon a screw-thread of the shaft $b$. Now, it will be seen that screwing up the plate J on either side of the drive-wheel will adjust for wear not only both drums, but also the axle $a$. Ball-bearings are not new; but this plan of hanging the two drums and the axle by four rows of balls and adjusting so simply is a feature of my invention.

The outer face of the bearing-plate J is provided with a boss, J', which fits into a spherical-shaped recess in the fork B or the extension B', the advantage of which is, that when the nut is screwed up to secure the shaft $b$ to the fork there will be no twist or strain in case the parts do not come together parallel.

The distinctive feature in my roller-clutch C is, that the frame $c$, carrying the rollers, does not fit closely on the axle $a$, but considerable room is left for it to move its center about in a plane at right angles to the axle $a$. The connecting-pin P enters a slot in the clutch-frame, and not into a hole, Fig. 4. The advantage of this arrangement is, that my clutch does not grip between the hub-ring and the axle, as is common; but the grip of one roller will immediately cause the other two rollers to grip also, and expansive force is equally outward on the ring. I know rollers are sometimes held up by springs; but still there is apt to be more grip to one roller than another, and thus bear powerfully against the axle. In my present machine this would not matter so much, since the axle revolves with the ring; but this is not always so.

The use of springs is dispensed with and a grip of all the rollers positively assured; and, again, if one roller slips the other two rollers press the frame over and secure a new grip at once of all three rollers, instead of depending on the two remaining.

An adjusting-plate, $c'$, is placed behind each roller to take up wear or lost motion, but note that only one need be moved at a time, as it will take up for all.

The rollers rest on separable bed-plates $c''$, removable in case of wear or breakage, or reversible end for end in case of wear.

As my machine is more dependent upon the brake in descending hills than in most other machines, I have devised a means for braking from the hind wheel. It consists simply of hanging a common mud-guard, K, Fig. 6, upon spring-rods $k\ k'$, so that it can be pressed down by the rider throwing one leg back and placing his foot on top of the guard. In case the rider cannot reach the guard, a rod, $k''$, with a foot-rest, $k'''$, can be run part way up the backbone.

In the construction of my hubs, instead of drilling and tapping the spokes directly into the hub, I cast a slot, L, (see Figs. 7, 8, 9,) in the back of the hub, into which I place a headed block, $l$, which block is drilled and tapped for the spoke. The slot L is so cast that the block $l$ can be put through from the inside, and thus not be liable to be drawn out. I do not confine myself to use this hub; hence the construction is shown only in detail. Fig. 5 shows the ordinary hub without spokes.

In describing chains connected with my machine it is of course understood that any sort of cable, strap, or other connection may be used. In fact, any means of transmitting the power over the periphery of the drive-wheel, whereby a downstroke on one side causes an upward pull on the other, to which I may be broadly entitled by virtue of former applications or acquired patents would be in some respects applicable to this machine.

The advantages in general not previously noticed my machine may be said to possess are, that I have no dead-centers, I have complete rest of legs on downgrade, least unnecessary motion of legs at all times, weight on front wheel while at work, but more on hind wheel when resting in saddle, increased safety, ease of mounting and dismounting, feet not liable to be thrown from treadles, narrow tread, hence less tendency to slip sidewise, increased steering-power, stretching of chains does not affect the perfect working of the machine, increased braking facilities on downgrade, rider's weight more on the treadles and not so much in saddle, and in general much less waste of energy.

Some of the above features are found in other machines; but I know of none which combines so many desirable points in a bicycle.

The construction of my ball-bearings is evident from the drawings. The circles of balls $d'\ d''$ are inclosed between V-shaped grooves cut in the circular faces of the bearing-disks, which come nearly together, leaving room only for adjustment for wear. In this particular bicycle the middle disk is grooved on both sides.

Having described my invention, what I claim, and desire to secure by Letters Patent, is—

1. In a bicycle, the hinged treadles E E', in combination with drums D D', so arranged as to revolve the said drums back and forward, together with means for transmitting the entire propelling-power over the periphery of the drive-wheel, substantially as described.

2. In a bicycle, the hinged treadles E and E', in combination with the drums D and D', chains G and G', together with the chain H, running over a suitable pulley, I, whereby the entire propelling-power is passed through one drum and the second drum drives the machine, substantially as described.

3. The roller-clutch C, having the inner frame, c, loose about the center, to allow for lateral motion, substantially as and for the purpose described.

4. In the roller-clutch of a bicycle, the setting-up plates c', substantially as described.

5. In the roller-clutch of a bicycle, the separable bed-plates c'', substantially as described.

6. In a bicycle, the drums D, running upon two rows of balls, d' and d'', the inner row of balls, d', serving as a bearing for the end of the axle a, and the outer row, d'', bearing in a plate or disk, J, substantially as described.

7. The plate or disk J, which serves as the outer bearing for the axle of a bicycle, said plate provided with a boss, J', fitting into a spherical recess of the fork B, substantially as and for the purpose described.

8. In a bicycle, the mud-guard K, arranged to give to the pressure of the rider's foot and bear down against the tire of the back wheel, substantially as and for the purpose described.

9. In a bicycle-wheel hub, the slotted recess L, so formed in the hub as to be molded in the manner described.

10. In a bicycle, the combination of the drums D D', operated as described, treadles E E', chains G, G', and H, pulley I, and clutch C, with suitable bearings for shaft and other parts, substantially as described.

11. In a bicycle, the combination of drums D D', operated as described, treadles E E', chains G, G', and H, pulley I, a double row of balls, d' d'', such as described, for shaft and drum bearings, together with suitable clutching mechanism, substantially as described.

12. In a ball-bearing for a bicycle, two disks provided with annular V-grooves in their circular faces, said faces coming nearly together and inclosing a circle of balls, and means for adjusting said disks one toward the other.

13. In a bicycle, the double row of balls d' d'', inclosed between grooves cut in the circular faces of the bearing-disks, the bearing consisting of one middle and two outside disks, the axle bearing toward the inside and the drum bearing on the outside, together with means for adjusting, consisting of a threaded screw working in the outer disk, which clamps against the fork end, substantially as described.

ROBERT P. SCOTT.

Witnesses:
CHARLES S. SCOTT,
JNO. T. MADDOX.